United States Patent [19]
Schmuck

[11] 3,813,567
[45] May 28, 1974

[54] ELECTRICAL CONTACT FOR STATORS IN ELECTRIC TOOLS

[75] Inventor: Peter Schmuck, Mauren, Liechtenstein, Germany

[73] Assignee: Hilti Aktiengesellschaft, Schaan, Fuerstentum, Germany

[22] Filed: Oct. 11, 1972

[21] Appl. No.: 299,392

[30] Foreign Application Priority Data
Nov. 8, 1971  Germany.......................... 2155457

[52] U.S. Cl.................. 310/50, 310/71, 310/239, 310/241
[51] Int. Cl. ............................................ H02k 7/14
[58] Field of Search .......... 310/50, 42, 47, 239, 71, 310/241, 242, 249, 258, 254, 89, 90

[56] References Cited
UNITED STATES PATENTS

| | | | |
|---|---|---|---|
| 2,662,194 | 12/1953 | Jepson | 310/50 |
| 3,237,036 | 2/1966 | Konig | 310/254 |
| 3,476,965 | 11/1969 | Harvey | 310/249 |
| 3,573,522 | 4/1971 | Pentland | 310/239 |
| 3,656,016 | 4/1972 | Jacyno | 310/239 |
| 3,665,228 | 5/1972 | Jacyno | 310/47 |
| 3,681,550 | 8/1972 | Perry | 310/241 |
| 3,699,366 | 10/1972 | Wood | 310/50 |

*Primary Examiner*—R. Skudy
*Attorney, Agent, or Firm*—Toren, McGeady and Stanger

[57] ABSTRACT

In an electric tool, a stator is secured within the tool housing against rotation and it is resiliently biased and held within the housing by means of a removable housing cover and springs. Contacts are provided on the stator and other contacts are connected to carbon brushes so that the resilient biasing action afforded by the cover and the springs holds the stator contacts and the carbon brush contacts in electrical engagement. The contacts are shaped to provide automatic engagement and disengagement upon the assembly and disassembly, respectively, of the stator within the housing.

10 Claims, 3 Drawing Figures

ELECTRICAL CONTACT FOR STATORS IN ELECTRIC TOOLS

SUMMARY OF THE INVENTION

The present invention is directed to an electric tool in which an axially displaceable stator is mounted in a housing and is secured against rotation, and, more particularly, it is directed to an arrangement of electrical contacts for the stator and for carbon brushes so that automatic engagement and disengagement of the contacts is obtained when a detachable housing cover is assembled and disassembled on the housing, respectively, under a spring biasing action.

In electric tools of the type mentioned above, it is necessary to replace a stator frequently due to damage, for example, because of excessive current. For the replacement of such a stator in a simple manner it has been known to use electric tools where the stator is surrounded by a sheath consisting of insulating material, with the stator and the sheath arranged in the tool housing and being exchangeable as a unit. It has been found that it is not advisable to secure the stator within the housing with screws, because the screw attachment easily becomes loose due to vibrations produced by the motor and the electric tool. To overcome this disadvantage devices have been used in which the stator, provided with guide elements on its circumference to secure it against rotation, is arranged for axial displacement in the housing and spring elements, such as rubber rings and the like, are loaded by a housing cover for securing the stator in its axial direction.

Devices of this known type generally use a carbon holder designed as a separate member and the carbon holder serves to receive carbon brushes acting on the rotor or commutator. The carbon holder is also arranged for displacement in the housing and, like the stator, is necessarily under spring tension when the cover is secured on the housing of the electric tool.

In electric tools of the type just described it is necessary to provide an electrical connection between the stator and the carbon brushes located in the carbon holder. Such a connection can be formed by arranging the carbon brushes on the carbon holder in guides made of a conductive material and providing a connection between the stator and the electrically conductive guides. Unfortunately, this arrangement was successful only in low-power tools, because the substantially higher currents in the more powerful tools and the transfer resistance between the carbon brushes and their guides play an excessive role. This disadvantage can be eliminated by connecting the flexible wire leading out of the brush, with which ordinary carbon brushes are provided, directly to the line leading out of the stator.

In each of these known arrangements when the stator or the carbon brushes are replaced, the electrical connection must be severed and restored, whether it acts directly on the brushes or merely on their guides. Disconnecting the electrical connection and subsequently reestablishing it is a time-consuming operation, since the tool housing is relatively narrow and, as a result, is not readily accessible with the available tools.

The various ways of establishing an electrical connection by screws, soldering, plug contacts and the like, can only be effected with a considerable expenditure of time and by the use of special tools.

In accordance with the present invention, an electric tool is provided with an exchangeable stator of the type described above which permits the electrical connection to be made between the stator and the carbon holder or the carbon brushes in an economical manner with a minimum number of tools.

Therefore, the problems previously experienced are overcome by an arrangement in which the stator and the carbon holder are provided with contacts which automatically provide the electrical connections between the carbon brushes and the stator under a spring action when the housing cover is secured to the tool housing.

Based on the arrangement provided by the present invention, not only is the electrical connection effected automatically upon assembly of the cover on the tool housing, but it is also automatically broken when the cover is removed or disassembled from the housing. By the utilization of a resilient biasing action, that is a spring tension, such as is necessary to fix the axially displaceable parts of the housing, that is the stator and the carbon holder, it is possible to assure a positive electrical connection even at extremely high vibrations, such as frequently occur in drills and other tools to which the present invention relates.

To eliminate the above-mentioned disadvantage of an additional transfer resistance between the carbon brush and carbon holder, it is possible to arrange the contact elements of the carbon holder as separate contact elements which are in electrical connection with the carbon brushes by means of a flexible wire. To assure that the separate contacts of the carbon holder do not interfere in the assembly as freely moving parts, the contacts are provided with claw-type projections which engage in corresponding openings in the carbon holder. Accordingly, a detachable plug connection is obtained between the contacts and the carbon holder and the connection can be broken and restored again at any time, that is, during the replacement of the carbon brushes. Such a plug connection provides a compact unit, even if there is a direct supply of current to the carbon brushes as required where high currents are involved.

Preferably, cylindrical compression springs are used for providing the spring tension acting on the housing cover when it is secured to the tool housing. However, other types of springs may be used, whether they are made of spring steel, rubber or other materials. The cylindrical compression springs are considered preferable because they can be secured in a simple manner on the stator by the interposition of a holding part formed of insulating material, and a contact element can be secured, in a simple manner, on the end of the spring spaced from the stator. Furthermore, cylindrical compression springs are advantageous because they are readily available as standard commercial parts and a relatively high tension can be produced by such springs in relation to their dimensions. There is the further advantage of such compression springs over rubber spring elements in that they are insensitive to heat, oil and the like.

By forming the contact elements of the stator and of the carbon holder or of the carbon brushes as cup-shaped members it is possible to fit one over the other and automatically provide a satisfactory electrical connection when the stator is assembled in the housing. Preferably, the outside diameter of the stator contact elements corresponds to the inside diameter of the cylindrical compression springs. Accordingly, the stator contact element can be fitted into the interior of the compression spring which is fixed to the stator.

To prevent the stator contact element from falling off the compression spring, it is provided with a flap-shaped extension which engages a turn of the compression spring. The combination of the stator, the springs and the cup-shaped elements provides a compact replaceable unit.

If, after the stator has been introduced into the tool housing, the carbon holder is inserted, the cup-shaped contact elements of both parts can be automatically connected together and thereby insure a satisfactory electrical contact between the replaceable parts, with the biasing action provided by the compression springs when the cover is attached by screws to the housing.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE DRAWING

Figure 1:
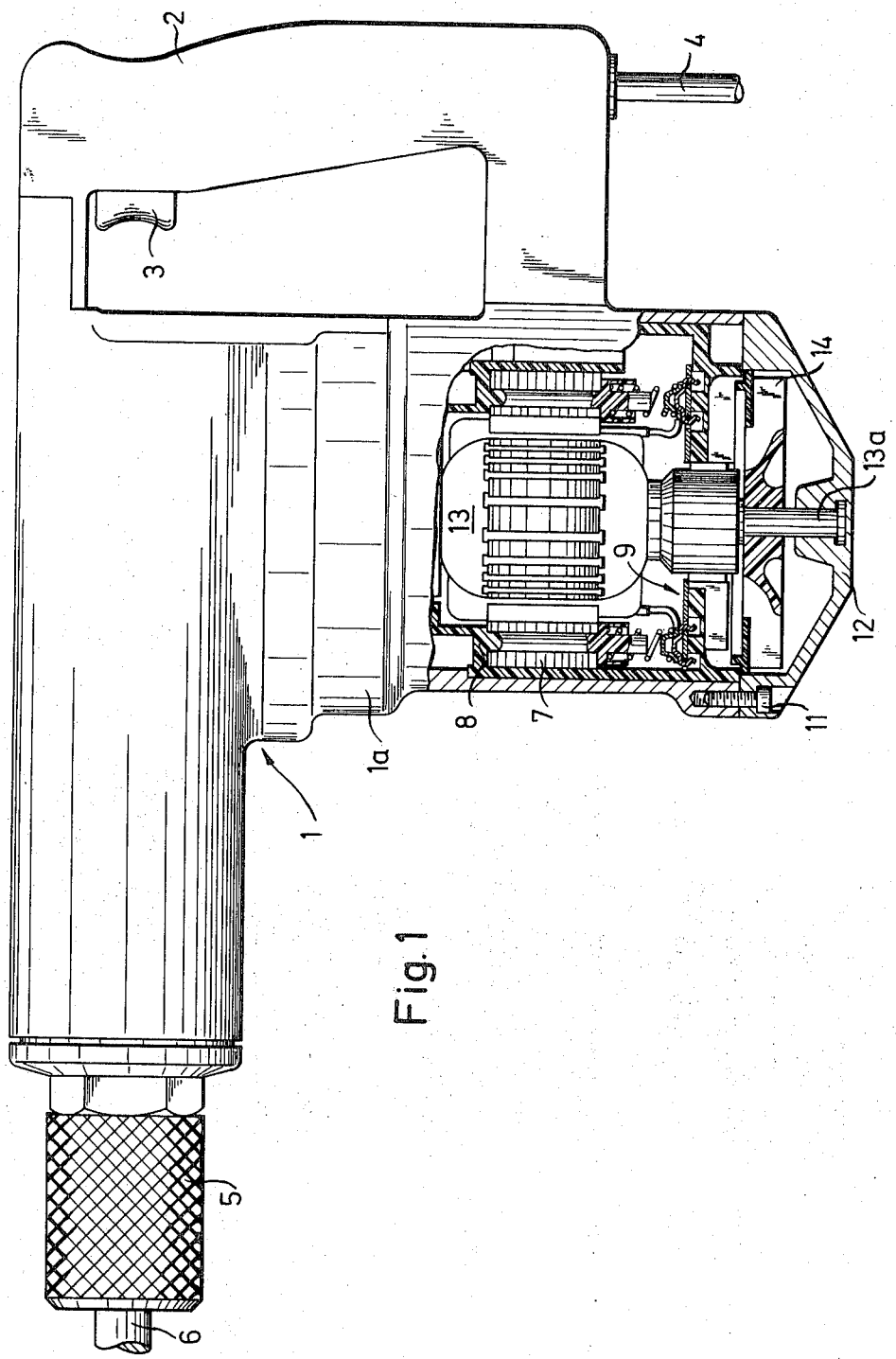
FIG. 1 is a side view, partly in section, of an electric tool embodying the present invention.

In FIG. 1 an electric tool 1 is illustrated formed of a tool housing 1a and a handle 2. The handle includes a pressure switch 3 located at the end of a power supply line 4 which extends into the handle. At the end of the tool housing 1a opposite the handle, a holder 5 is provided in which a drill or similar working tool 6 can be positioned. Within the portion of the tool housing 1a shown in section in FIG. 1, a stator 7 is positioned surrounded by a sheath or casing 8 formed of insulating material. The stator 7 along with its casing 8 is mounted in the tool housing 1a for axial displacement. A carbon holder 9 is also mounted in the tool housing 1a for axial displacement and the outside dimensions of the carbon holder correspond to those of the casing 8 of the stator 7. The stator 7 and the carbon holder 9 are fixed into position axially by a removable housing cover 12 secured to the tool housing 1a by means of screws 11. Positioned radially inwardly of the stator 7 is a rotor 13 which is mounted on the housing cover 12 and a shaft end 13a extends from the rotor to the housing cover and supports a fan blade 14 which cools the motor within the housing.

Figure 2:
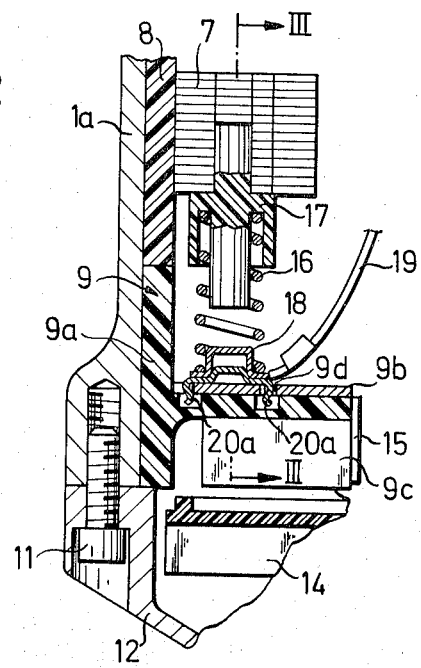
FIG. 2 is an enlarged sectional view of a portion of the tool shown in FIG. 1.

As shown in detail in FIG. 2, the carbon holder 9 consists of a cylindrically shaped part 9a having a plate-like portion extending transversely of its cylindrical walls and, preferably, the part 9a is formed of insulating material. Further, the carbon holder includes a plate 9b, preferably formed of a conductive material, mounted on the plate-like portion of part 9a. The plate 9b can be formed of brass, copper, steel and the like. Box-shaped recesses 9c are formed in the plate 9b and extend through the plate-like portion of the part 9a, note FIG. 3. Carbon brushes 15 are positioned within the recesses 9c. The carbon brushes are mounted in the recesses 9c for axial displacement and are biased toward the rotor 13 by known springs, not shown, so that an effective contact with the rotor 13 is assured even when there is considerable wear of the carbon brushes 15.

Figure 3:
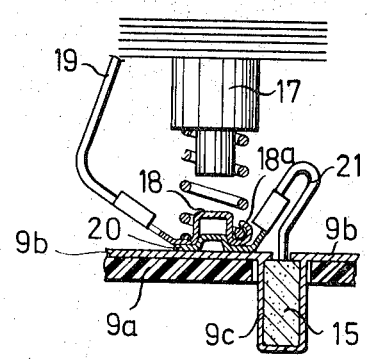
FIG. 3 is a sectional view taken along the line III—III in FIG. 2.

As shown in FIGS. 1–3, compression springs 16 extend between the stator 7 and the carbon holder 9. As viewed in the drawings, the upper ends of the springs 16 are secured into pin-shaped holding elements 17 which are preferably formed of an insulating material. The compression springs 16 fix the stator 7 and the carbon holder 9 in position for axial displacement within the housing 1a when the housing cover 12 has been secured to the housing 1a. Located on the opposite ends of the compression springs 16 from the holding elements 17 are cup-shaped contact elements 18. A flap-shaped extension 18a on the contact elements 18 secure the elements to the spring, that is the flap-shaped extension is secured over a portion of one coil of the spring. The cup-shaped contact elements 18 are connected to the stator 7 by means of lines 19. Spaced below and shaped to fit into the contact elements 18 are cup-shaped elements 20. As can be seen in the drawings, the dimensions of the contact elements 20 corresponding to those of the contact elements 18 are smaller. Each contact element 20 is provided with claw-type extensions or projections 20a which are secured into openings 9d in the plate 9b of the carbon holder 9. The contact elements 20, which are connected to the carbon brushes 15 by means of a flexible wire 21, are attached to the carbon holder 9 so that the carbon holder together with the contact elements 20 form a compact unit. The contact elements 18 and 20 are dimensioned so that the cup-shaped surfaces fit one into the other and assure contact between the two.

It can be appreciated that it would be possible to omit the contact elements completely and to establish the electrical connection to the carbon brushes over the plate which is formed of a conductive material. However, this alternative arrangement has the disadvantage, already mentioned above, of additional transfer resistance, and such transfer resistance is avoided by the arrangement illustrated in the drawings.

While a specific embodiment of the invention has been shown and described in detail to illustrate the application of the inventive principles, it will be understood that the invention may be embodied otherwise without departing from such principles.

What is claimed is:

1. An electric tool comprising a housing, a detachable housing cover secured to said housing, an axially displaceable stator located within said housing and secured therein against rotation, means in cooperation with said housing cover for resiliently biasing said stator in its axial direction within said housing, a carbon holder located within said housing, carbon brushes arranged in said carbon holder and disposed in electrical contact with said stator, wherein the improvement comprises contact means in operative association with said biasing means and including separate first contacts and second contacts with said first contacts connected to said carbon brushes and said second contacts connected to said stator so that the biasing action of said biasing means acting in cooperation with said housing cover provides the engagement of said first and second contacts and automatically effects the electrical connection between said carbon brushes and said stator.

2. An electric tool, as set forth in claim 1, wherein said first contacts are secured to said carbon holder, and a flexible wire connects said first contacts and said carbon brushes.

3. An electric tool, as set forth in claim 2, wherein said carbon holder having openings therein, said first contacts having claw-shaped projections extending into the openings in said carbon holder and arranged in contacting engagement with said carbon holder.

4. An electric tool, as set forth in claim 3, wherein said carbon holder comprises a plate member and a cylindrically-shaped section having a plate-like section integral therewith and extending radially inwardly from said cylindrically-shaped section, said cylindrically-shaped section and said plate-like section being formed of an insulating material, said plate member being formed of a conductor material and supported on said plate-like section, the opening in said carbon holder being formed by openings in said plate member in register with recessed portions in said plate-like sections, said first contacts being mounted on said plate member with said claw-shaped projection extending through the openings in said plate member to the recesses in said plate-like section, and said plate-like section having openings therethrough and said plate member having recesses extending into the openings in said plate-like section and into which said carbon brushes are fitted.

5. An electric tool, as set forth in claim 2, wherein said means for resiliently biasing said stator comprises cylindrical compression springs extending in the axial direction of said stator and located between said stator and said carbon holder within said housing.

6. An electric tool, as set forth in claim 5, wherein said cylindrical compression springs are secured at one end to said stator, and said second contacts are secured to the opposite ends of said springs from said stator for interengagement with said first contacts.

7. An electric tool, as set forth in claim 6, wherein said first contacts and said second contacts each have a cup-shaped configuration so that they interfit.

8. An electric tool, as set forth in claim 7, wherein said second contacts are shaped to fit over said first contacts so that the inner surface of said cup-shaped second contacts seats against the outer surface of said cup-shaped first contacts.

9. An electric tool, as set forth in claim 8, wherein a curved extension is formed on each of said second contacts and said curved extension partly encloses one coil of said spring at the end which seats against said second contact.

10. An electric tool, as set forth in claim 9, wherein pin-shaped holding elements formed of an insulating material are secured to said stator and each of said springs is fitted onto one of said holding elements at its end opposite the end supporting said second contacts, and cables extend between said second contacts and said stator.

* * * * *

UNITED STATES PATENT OFFICE
CERTIFICATE OF CORRECTION

Patent No. 3,813,567            Dated May 28, 1974

Inventor(s) Peter Schmuck

It is certified that error appears in the above-identified patent and that said Letters Patent are hereby corrected as shown below:

In the heading of the patent:

The address of the inventor should read:

--Mauren, Fuerstentum Liechtenstein--.

The address of the assignee should read:

--Schaan, Fuerstentum Liechtenstein--.

Signed and sealed this 8th day of October 1974.

(SEAL)
Attest:

McCOY M. GIBSON JR.            C. MARSHALL DANN
Attesting Officer               Commissioner of Patents